(12) United States Patent
Wang et al.

(10) Patent No.: US 6,643,649 B2
(45) Date of Patent: Nov. 4, 2003

(54) UTILITY FOR CROSS PLATFORM DATABASE QUERY

(75) Inventors: Shirley S. Wang, San Jose, CA (US); Lynda Arnold Hansen, San Jose, CA (US); San-Ju Lin Shi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 09/772,829

(22) Filed: Jan. 30, 2001

(65) Prior Publication Data

US 2002/0103790 A1 Aug. 1, 2002

(51) Int. Cl.$^7$ ................................................ G06F 17/30
(52) U.S. Cl. ........................... 707/9; 707/5; 707/10; 707/101
(58) Field of Search ..................... 707/3, 4, 8, 10, 707/100, 102, 103 R, 203, 2, 5, 7, 9, 101; 705/51, 53, 80

(56) References Cited

U.S. PATENT DOCUMENTS

| | | | |
|---|---|---|---|
| 5,241,648 A | | 8/1993 | Cheng et al. .................... 707/7 |
| 5,345,586 A | * | 9/1994 | Hamala et al. ................ 707/10 |
| 5,367,675 A | * | 11/1994 | Cheng et al. .................... 707/2 |
| 5,649,185 A | * | 7/1997 | Antognini et al. .............. 707/9 |
| 5,701,461 A | | 12/1997 | Dalal et al. ..................... 707/4 |
| 5,717,915 A | * | 2/1998 | Stolfo et al. ..................... 707/5 |
| 5,822,750 A | * | 10/1998 | Jou et al. ........................ 707/2 |
| 6,161,103 A | * | 12/2000 | Rauer et al. .................... 707/4 |
| 6,212,524 B1 | * | 4/2001 | Weissman et al. ........... 707/101 |
| 6,275,818 B1 | * | 8/2001 | Subramanian et al. ......... 707/2 |
| 6,480,836 B1 | * | 11/2002 | Colby et al. .................... 707/3 |
| 6,523,027 B1 | * | 2/2003 | Underwood .................... 707/4 |

* cited by examiner

Primary Examiner—Shahid Al Alam
(74) Attorney, Agent, or Firm—Sawyer Law Group LLP

(57) ABSTRACT

The present invention provides a utility for cross platform database query. In a preferred embodiment, the utility resides at an object server in a data system. The utility obtains a set of data items from a library server in the data system; places the set of data items from the library server in a temporary table at the object server; obtains each data item from the temporary table and the base object table; and converts each data item from the temporary table and the base object table, if a conversion is required, such that each data item from the temporary table and the base object table may be compared. Because the utility, the temporary table, and the base object table all reside at the same server, the utility knows whether or not to convert the data items so that a conflict free comparison is performed. In this manner, the utility need not actually know what platform is used by the library server, yet, data at the library server and the object server can be properly compared.

10 Claims, 3 Drawing Sheets

UTILITY FOR CROSS PLATFORM DATABASE QUERY

FIELD OF THE INVENTION

The present invention relates to databases, and more particularly to data query to databases.

BACKGROUND OF THE INVENTION

FIG. 1 illustrates one conventional system for managing data. The system 100 is known in the industry as the Content Manager system developed by International Business Machines, Corporation™. The system 100 is a triangular client/server architecture, with the architecture comprising a client 102, a library server 104, and an object server 106. A client 102 sends a request to the library server 104. The library server 104 forwards the request to the object server 106 and responds to the client's request. The object server 106 then responds to the library server's request, delivering the requested digital data object to the client 102. The library server 104 uses a relational database to manage digital objects and provide data integrity. It maintains index information and controls access to objects stored on the object server 106. The library server 104 directs requests from the client 102 to update or query entries in the library catalog. The catalog contains object indexes and description information. The object server 106 is the repository for objects stored in the system 100. Users store and retrieve digital objects in the object server 106 by routing requests through the library server 104.

In order to properly access the objects stored at the object server 106, the index information at the library server 104 and the digital objects at the object server 106 must be properly synchronized. Errors occur when the index information at the library server 104 and the digital objects at the object server 106 become out-of-sync. This may occur with events such as power failures. With these errors, the client 102 is unable to reliably access the data.

To identify the errors, the object server 106 compares each data obtained by directly querying the library server 104 with the data at the object server 106. Conventionally, this comparison uses the C function, "strcmp", which is part of the American National Standards Institute (ANSI) standard. However, a problem occurs when the library server 104 uses a data platform which is not compatible with the "strcmp". For example, assume that the library server 104 and the object server both use the DB2™ platform. The data from the library server 104 does not have a sort key compatible with "strcmp". The data at the object server 106 also does not have a sort key compatible with "strcmp". Thus, a conflict occurs when the comparison is attempted of these. The object server 106 can solve this problem for the data at the object server 106 by converting the data so that it is compatible with "strcmp", since the object server 106 is aware that it is using the DB2 platform. However, the object server 106 is not aware of the platform used by the library server 104. The object server 106 cannot determine whether or not the data returned by the library server 104 is compatible with "strcmp". Thus, the object server 106 cannot perform any proper conversions. A reliable comparison of the data cannot be made.

Accordingly, there exists a need for a utility for a cross platform database query. The present invention addresses such a need.

SUMMARY OF THE INVENTION

The present invention provides a utility for cross platform database query. In a preferred embodiment, the utility resides at an object server in a data system. The utility obtains a set of data items from a library server in the data system; places the set of data items from the library server in a temporary table at the object server; obtains each data item from the temporary table and the base object table; and converts each data item from the temporary table and the base object table, if a conversion is required, such that each data item from the temporary table and the base object table may be compared. Because the utility, the temporary table, and the base object table all reside at the same server, the utility knows whether or not to convert the data items so that a conflict free comparison is performed. In this manner, the utility need not actually know what platform is used by the library server, yet, data at the library server and the object server can be properly compared.

DETAILED DESCRIPTION

The present invention provides a utility for a cross platform database query. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 and 3 in conjunction with the discussion below.

Figure 1:
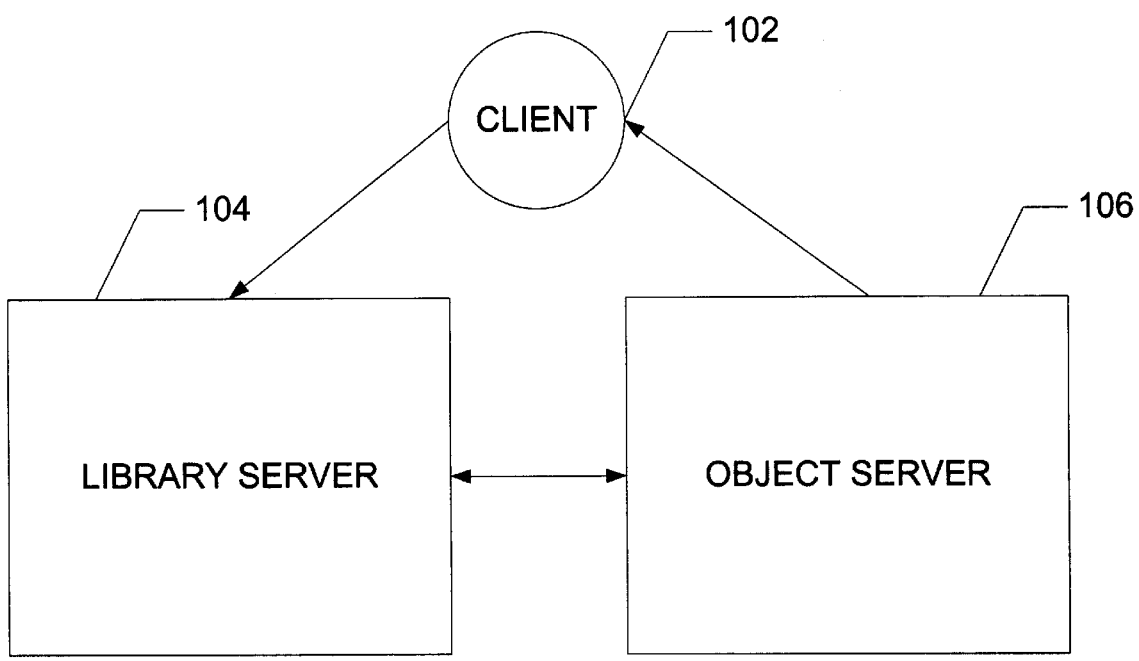
FIG. 1 illustrates one conventional system for managing data.
Figure 2:
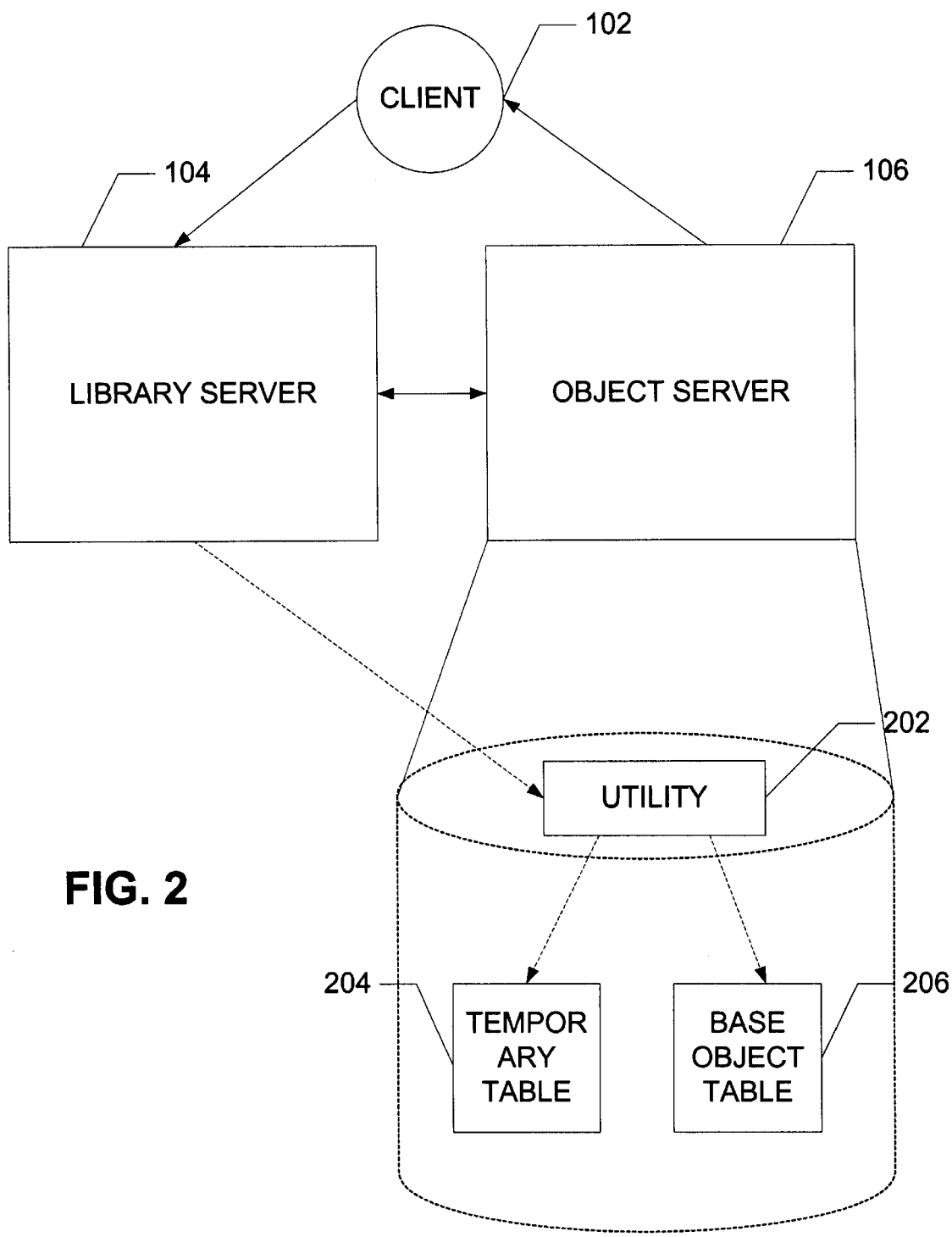
FIG. 2 illustrates a preferred embodiment of a system using the utility for a cross platform database query in accordance with the present invention.

FIG. 2 illustrates a preferred embodiment of a system using the utility for a cross platform database query in accordance with the present invention. In the preferred embodiment, the utility 202 resides at the object server 106. The utility 202 is a software which queries the library server 104 for a set of data items to be compared with the data at the object server 106. The set of data items from the library server 104 is placed in a temporary table 204. Data at the object server 106 is stored in a base object table 206.

Figure 3:
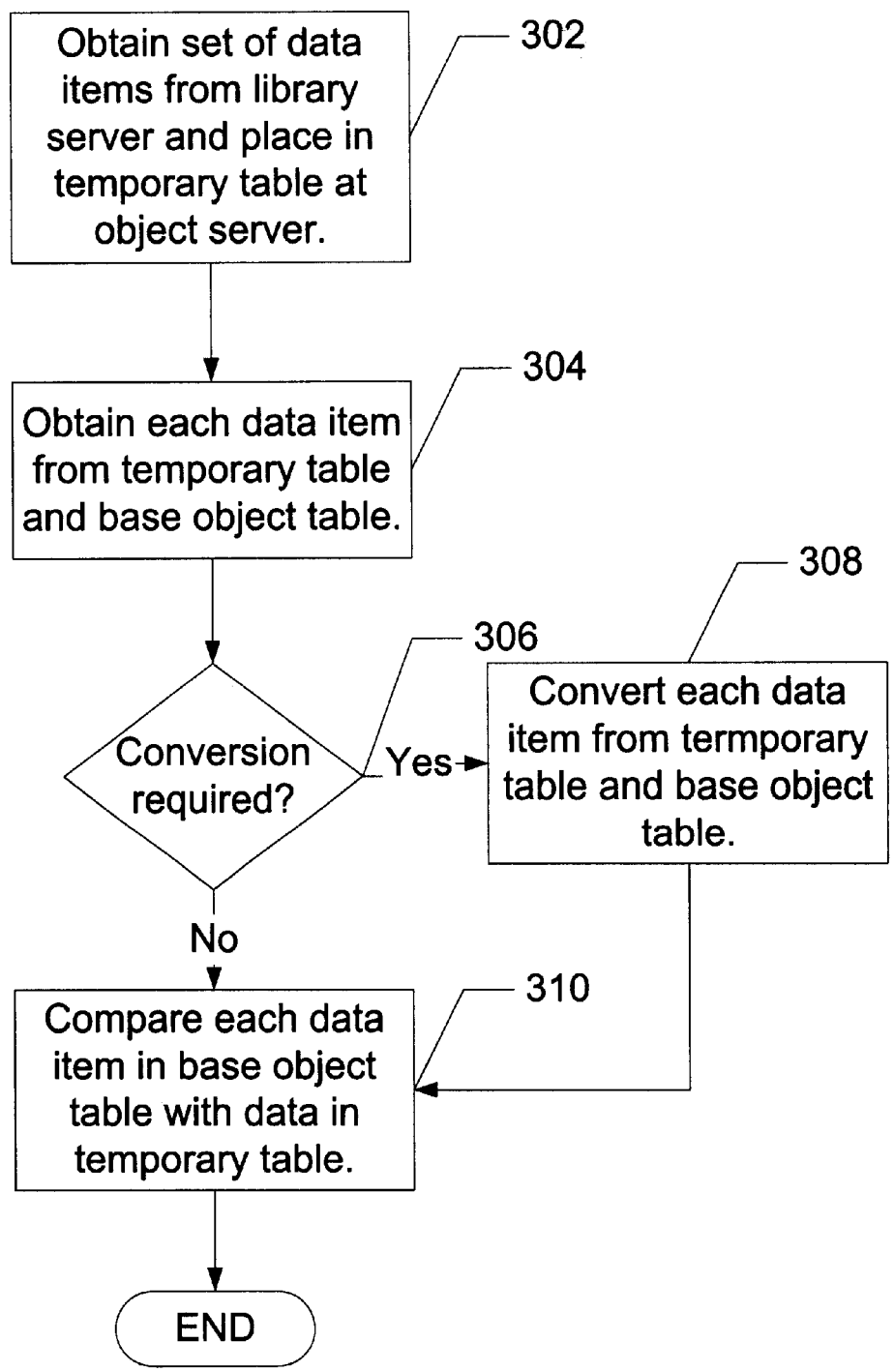
FIG. 3 is a flowchart illustrating the preferred embodiment of the utility for a cross platform database query in accordance with the present invention.

FIG. 3 is a flowchart illustrating the preferred embodiment of the utility for a cross platform database query in accordance with the present invention. First, a set of data items is obtained from the library server 104 and placed in the temporary table 204 at the object server 106, via step 302. In the preferred embodiment, the set of data items is obtained by sending a Structured Query Language (SQL) query to the library server 104 using appropriate parameters. The results for the query are then placed into the temporary table 204 at the object server 106 in a format in accordance with the platform used by the object server 106. Next, the utility 202 obtains each data item from the temporary table and the base object table, via step 304. In the preferred embodiment, the utility 202 sends queries to the temporary table and the base object table. Each data item returned is then compared. Before the actual comparison, the utility 202 determines if a conversion of the data items from the temporary table 204 and the base object table 206 are required, via step 306. A conversion is required if the data items from the temporary table 204 and the base object table 206 do not have sort keys which are compatible with the C function, "strcmp". If the data items require conversion, then the utility 202 converts them, via step 308; such that the data items may be compared. In the preferred embodiment, this is such that the data items are sorted in a manner which is compatible with "strcmp". The data items from the base object table 206 is then compared with the data items from the temporary table 204, via step 310.

An important feature of the present invention is that the set of data items from the library server 104 is first obtained and placed into a database temporary table 204 at the object server 106 before the comparison is performed. When the library server 104 responds to the query from the utility 202 for the set of data items, via step 302, the returned data items are placed into the temporary table 204 in a format used by the object server's platform. Thus, when the utility 202 queries for each data item in the temporary table 204 and the base object table 206, the returned data items are both in the format used by the object server's platform. The utility 202 is able to determine whether or not the data items from the library server 104 needs to be converted.

For example, assume that the library server 104 uses the DB2 platform while the object server 106 uses the Oracle platform. The utility 202 first sends a SQL query to the library server 104 and obtains a set of data items from it, via step 302. This set of data items is placed in the temporary table 204 at the object server 106. Although the library server 104 is using the DB2 platform, the returned set of data items is placed into the temporary table 204 in accordance with the Oracle platform. The data at the object server 106 is stored in the base object table 206. The utility 202 then queries the temporary table 204 and the base object table 206 for each data item to be compared. Since the utility 202, the temporary table 204, and the base object table 206 all reside at the object server 106, the utility 202 knows the platform used by the object server 106 and that data from the temporary table 204 and the base object table 206 are in a format in accordance with this platform. For this example, the utility 202 knows that the object server 106 is using the Oracle platform, and that the data items from the temporary table 204 and the base object table 206 are in the Oracle format. The utility 202 thus does not perform any conversion of the data items because the Oracle format is compatible with "strcmp". The utility 202 then compares the data items from the temporary table 204 with the data from the base object table 206 using "strcmp", via step 310. The results of the comparison may then be presented in the form of a report.

For another example, assume that the library server 104 uses the Oracle platform while the object server 106 uses the DB2 platform. The utility 202 first sends a SQL query to the library server 104 and obtains a set of data items from it, via step 302. This set of data items is placed in the temporary table 204 at the object server 106. Although the library server 104 is using the Oracle platform, the returned set of data items is placed into the temporary table 204 in accordance with the DB2 platform. The returned set of data items is placed into the database temporary table 204 in accordance with the DB2 platform. The data at the object server 106 is stored in the base object table 206. The utility 202 then queries the temporary table 204 and the base object table 206 for each data item to be compared. For this example, the utility 202 knows that the object server 106 is using the DB2 platform, and that the data items from the temporary table 204 and the base object table 206 are in the DB2 format. The utility 202 thus converts the sort keys of the data items, via step 308, so that they are compatible with "strcmp". For this example, a HEX is added to the sort keys. The utility 202 then compares the data items from the temporary table 204 with the data from the base object table 206 using "strcmp", via step 310. The results of the comparison may then be presented in the form of a report.

In this way, the utility 202 need not actually know what platform is used by the library server 104, yet, data at the library server 104 and the object server 106 can be properly compared.

Although the present invention is described above in the context of the C function "strcmp", one of ordinary skill in the art will understand that the present invention may apply to other functions without departing from the spirit and scope of the present invention.

A utility for a cross platform database query has been described. In the preferred embodiment, the utility resides at the object server and places data items obtained from the library server in a temporary table at the object server. The data at the object server is stored in a base object table. The utility then obtains each data item from the temporary table and the base object table to be compared. Because the utility, the temporary table, and the base object table all reside at the same server, the utility knows whether or not to convert the data items so that a conflict free comparison is performed. In this manner, the utility need not actually know what platform is used by the library server, yet, data at the library server and the object server can be properly compared.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for cross platform database query in a data system, the data system including a library server and an object server, the object server including a base object table containing data items, comprising the steps of:

(a) obtaining a set of data items from the library server;

(b) placing the set of data items from the library server in a temporary table at the object server;

(c) obtaining each data item from the temporary table and the base object table; and (d) converting each data item from the temporary table and the base object table, if a conversion is required, such that each data item from the temporary table and the base object table may be compared.

2. The method of claim 1, wherein the obtaining step (a) comprises:

(a1) sending a Structured Query Language (SQL) query to the library server; and (a2) receiving the set of data item from the library server in response to the SQL query.

3. The method of claim 1, wherein the converting step (d) comprises:

(d1) determining if the object server is using a platform compatible with a standard; and (d2) converting each data item from the temporary table and the base object table, such that each data from the temporary table and the base object table are sorted in a manner compatible with the standard.

4. The method of claim 1, further comprising:

(e) comparing each data item from the temporary table and the base object table.

5. A computer readable medium with program instructions for cross platform database query in a data system, the data system including a library server and an object server, the object server including a base object table containing data items, the instructions for:

(a) obtaining a set of data items from the library server;

(b) placing the set of data items from the library server in a temporary table at the object server;

(c) obtaining each data item from the temporary table and the base object table; and (d) converting each data item from the temporary table and the base object table, if a conversion is required, such that each data item from the temporary table and the base object table may be compared.

6. The medium of claim 5, wherein the obtaining instruction (a) comprises instructions for:

(a1) sending a SQL query to the library server; and (a2) receiving the set of data items from the library server in response to the SQL query.

7. The medium of claim 5, wherein the converting instruction (d) comprises instructions for:

(d1) determining if the object server is using a platform compatible with a standard; and (d2) converting each data item from the temporary table and the base object table, such that each data item from the temporary table and the base object table are sorted in a manner compatible with the standard.

8. The medium of claim 5, further comprising instructions for:

(e) comparing each data item from the temporary table and the base object table.

9. A system, comprising:

a library server;

an object server, where the object server comprises a utility for cross platform database query, a temporary table, and a base object table;

wherein the utility:

(a) obtains a set of data items from the library server;

(b) places the set of data items from the library server in the temporary table at the object server;

(c) obtains each data item from the temporary table and the base object table; and (d) converts each data item from the temporary table and the base object table, if a conversion is required, such that each data item from the temporary table and the base object table may be compared.

10. The system of claim 9, wherein the utility:

(a) obtains a set of data items from the library server;

(b) places the set of data items from the library server in the temporary table at the object server;

(c) obtains each data item from the temporary table and the base object table;

(d) determines if the object server is using a platform compatible with a standard;

(e) converts each data item from the temporary table and the base object table, such that each data item from the temporary table and the base object table are sorted in a manner compatible with the standard; and (f) compares each data item from the temporary table and the base object table.

* * * * *